Sept 10, 1957

J. G. INGRES 2,805,647

BOOSTER BRAKE MECHANISM

Filed Aug. 31, 1955

INVENTOR
JEANNOT G. INGRES

BY John F. Phillips

ATTORNEY

Sept 10, 1957 J. G. INGRES 2,805,647
BOOSTER BRAKE MECHANISM
Filed Aug. 31, 1955 4 Sheets-Sheet 2

INVENTOR
JEANNOT G. INGRES

BY John F. Phillips
ATTORNEY

Sept 10, 1957
J. G. INGRES
2,805,647
BOOSTER BRAKE MECHANISM
Filed Aug. 31, 1955
4 Sheets-Sheet 3
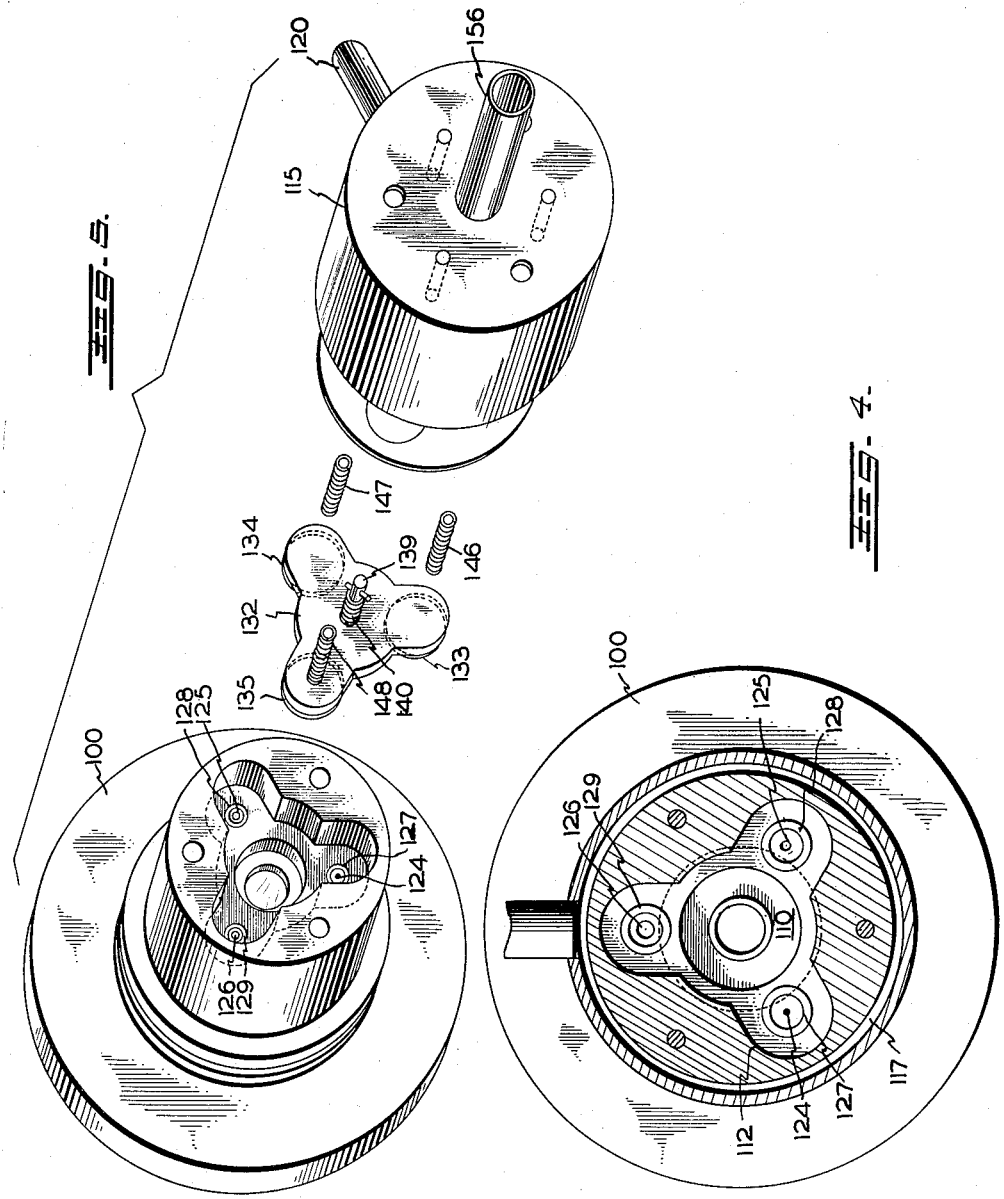
INVENTOR
JEANNOT G. INGRES
BY *John F. Phillips*
ATTORNEY Sept 10, 1957   J. G. INGRES   2,805,647
BOOSTER BRAKE MECHANISM
Filed Aug. 31, 1955   4 Sheets-Sheet 4
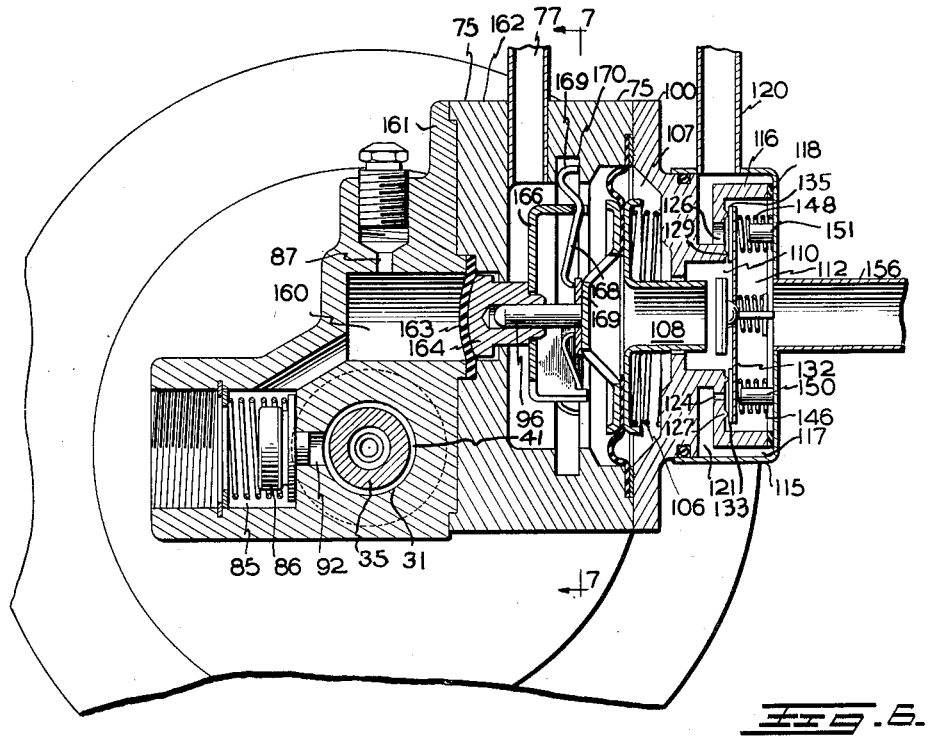
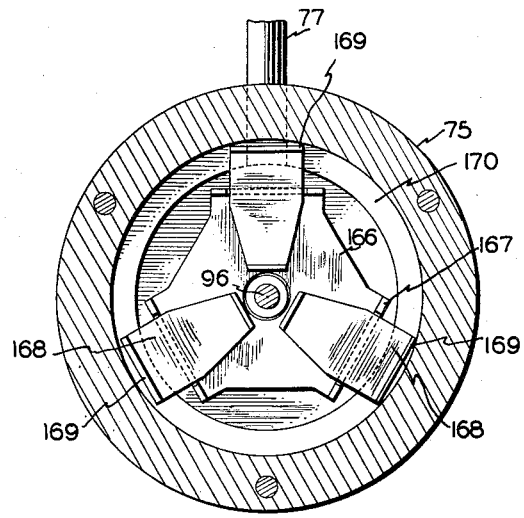
INVENTOR
JEANNOT G. INGRES
BY John X. Phielps
ATTORNEY ered by the head 12. The body 20 and member 24 cooperate to form a recess receiving an annular seal 25, preferably in the form of an O-ring, in fluid sealing engagement with the smooth outer surface portion of the nut 23. The member 24 positions a motor return spring 26 engaging at opposite ends against the piston 14 and head 12.

United States Patent Office 2,805,647
Patented Sept. 10, 1957

2,805,647

BOOSTER BRAKE MECHANISM

Jeannot G. Ingres, Dearborn, Mich., assignor to Kelsey-Hayes Company, a corporation of Delaware Application August 31, 1955, Serial No. 531,661

14 Claims. (Cl. 121—38)

This invention relates to a booster brake mechanism, and more particularly to a novel modulated control valve means for the booster motor of a hydraulic brake system.

In my copending application Serial No. 531,437, filed August 30, 1955, I have disclosed a novel combination of elements including a new control valve mechanism by which a much better modulation of the motor action is provided, and wherein relatively sudden energization of the motor and a correspondingly relatively sudden increase in pedal reaction during initial energization of the motor is prevented. This is accomplished in the copending application referred to by providing cooperating valves controlling a variable pressure booster motor chamber, the two valves comprising a normally open vacuum valve and a normally closed air valve. In the actuation of the device, the vacuum valve is first closed to disconnect the variable pressure motor chamber from the source of vacuum and to then tilt the air valve on its seat to "crack" the variable pressure motor chamber to the atmosphere. This initial valve actuation provides for a restricted flow of air to the motor, thus limiting its degree of energization in proportion to the rate of operation of the valve mechanism. As brake pedal actuation proceeds, the air valve will be bodily lifted from its seat to provide for the maximum energization of the booster motor, if desired.

An important object of the present invention is to provide a booster brake mechanism wherein the controlling of the booster motor is provided through a valve mechanism having two or more air valves which are progressively opened as brake actuation progresses, the first air opening uncovered to the variable pressure chamber of the motor being a restricted opening and the air ports opened in later stages being progressively larger, whereby motor energization takes place to an initially restricted extent followed by more complete energization, thus preventing the booster motor piston from "jumping" from normal position during initial energization of the motor.

A further object is to provide such an apparatus wherein a plurality of air ports are provided, adapted to be progressively uncovered by a plurality of air valves carried by a plate which rocks on changing fulcrums as valve actuation takes place to successively open air ports of progressively larger areas, thus providing for a much smoother and more uniformly progressive energization of the booster motor.

A further object is to provide such an apparatus wherein a tubular member affords normal communication between the variable pressure chamber of the booster motor and a source of vacuum to normally vacuum-suspend the motor, and wherein the lever plate which carries the air valves also carries a vacuum valve engageable by said tubular member to close the latter and to effect actuation of the lever plate to provide the operation of the latter referred to above.

A further object is to provide an apparatus of the character referred to which lends itself particularly well to use in connection with that type of booster mechanism wherein fluid displaced from a conventional pedal operated master cylinder is utilized for effecting actuation of the valve mechanism of the booster motor and which assists the booster motor in applying the brakes, and to provide in conjunction with the valve mechanism a return spring device the compressive forces of which may be so designed that the initial actuation of the motor takes place simultaneously with or before or after initial utilization of the master cylinder pressures for assisting the booster motor in applying the brakes.

Other objects and advantages of the invention will become apparent during the course of the following description.

In the drawings I have shown two embodiments of the invention. In this showing:

Figure 4 is an enlarged detail sectional view on line 4—4 of Figure 2;

Figure 5 is an enlarged detail perspective view of the valve mechanism and associated parts, the elements being shown separated;

Figure 6 is a view similar to Figure 2 showing a modified form of the invention; and Figure 7 is a detail sectional view on line 7—7 of Figure 6.

It will become apparent that the present invention has been shown in conjunction with a type of booster mechanism wherein hydraulic fluid displaced from a conventional master cylinder operates the valve mechanism for the booster motor and assists the latter in moving a fluid displacing plunger to deliver hydraulic fluid under pressure to the wheel cylinders. It also will become apparent that while such system is shown as being provided with a single hydraulic chamber and a single plunger therein for displacing fluid into all the wheel cylinders, the invention is not limited to such type of mechanism or necessarily to the type employing a conventional master cylinder.

Figure 1:
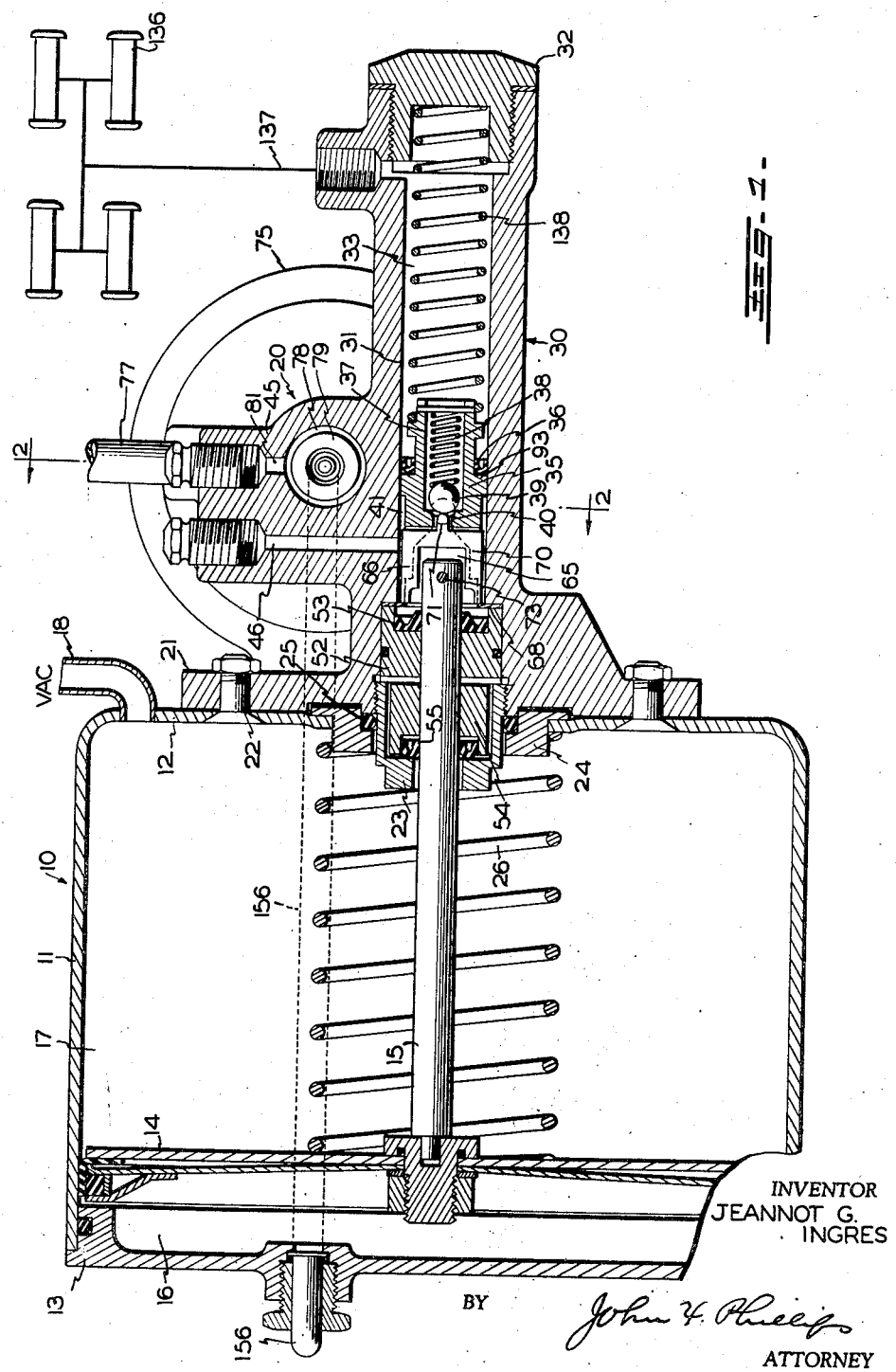
Figure 1 is an axial sectional view through the booster mechanism, the wheel cylinders of the braking system being diagrammatically represented.

The booster motor is indicated as a whole in Figure 1 by the numeral 10 and comprises a cylinder 11 having at one end an integral head 12 and at its other end a removable preferably die-cast head 13. The pressure responsive unit of the motor comprises a piston 14 reciprocable in the cylinder 11 and having a piston rod 15 connected thereto to be actuated by the piston. The casing 11 is divided by the piston 14 to form a variable pressure chamber 16 and a constant pressure chamber 17, shown in the present instance as being connected to a source of vacuum through a duct 18. The motor in the present instance is of the vacuum suspended type; hence the chamber 16 is normally connected to the source of vacuum as described below.

A preferably die-cast body 20 is arranged at the right-hand end of the motor in Figure 1 and is provided with a cylindrical flange 21 bolted as at 22 to the cylinder head 12. Axially of the motor, a hollow nut 23 is threaded into the body 20 and an annular member 24 is arranged over the nut 23 and is maintained in position by the head 12 and flange 21. The body 20 and member 24 cooperate to form a recess receiving an annular seal 25, preferably in the form of an O-ring, in fluid sealing engagement with the smooth outer surface portion of the nut 23. The member 24 positions a motor return spring 26 engaging at opposite ends against the piston 14 and head 12.

A cylindrical extension 30 is preferably formed as an integral part of the body 20, coaxial with the motor, and is provided therein with a bore 31 closed at one end by a cap 32 to form a hydraulic chamber 33. A fluid displacing and pressure generating plunger 35 is slidable in the bore 31 and is fluid-sealed with respect to such bore by a double-lipped seal 36. A bore 37 is formed in the plunger 35. A spring 38 is arranged in the bore 37 and engages a ball valve 39 to bias the latter to the left in Figure 1 to close a port 40 communicating between opposite ends of the bore 31. One end of this bore forms the chamber 33 and the other end forms an inlet chamber 41 for hydraulic fluid from the master cylinder, as will become apparent below.

Formed integral with the body 20 is an enlargement 45 in one side of which (Figure 1) is formed a passage 46 communicating at one end with the chamber 41. A conventional air bleeding fitting is connected to the outer end of the passage 46.

The piston rod 15 is slidable in a bearing 52 mounted in the body 20 and provided with a double-lipped seal 53 to prevent leakage of hydraulic fluid around the piston rod 15. The bearing 52 obviously axially guides the piston rod 15. A second bearing 54 surrounds the piston rod 15 and floats in the nut 23, the bearing 54 having a double-lipped seal 55 forming a second fluid seal around the piston rod 15.

The port 40 is formed intermediate the end of the plunger 35, and to the left of such port, as viewed in Figure 1, the plunger is axially recessed as at 65 and diametrically slotted as at 66. The left-hand extremity of the plunger 35 is limited in its movement to off position by engagement with a washer 68 (Figure 1) held in position by the bearing 52. Within the slot 66 is arranged a flat substantially U-shaped control member 70 for the valve 39. The extremities of the arms of the member 70 seat against the washer 68 to limit movement of the member toward the left as viewed in Figure 1. The member 70 has an axial extension 71 projecting through port 40 and unseating the ball 39 when the parts are in the normal positions referred to. The right-hand end of the piston rod 15 extends between the arms of the member 70 and into the recess 65 and is provided with a transverse pin 73 to positively connect the rod 15 to the plunger 35.

An annular enlargement 75 is formed on the body 20 and has its axis above and at right angles to the axis of the bore 31. This enlargement is provided with a vacuum chamber 76 therein (Figure 3) in constant communication with a line 77 connected to a suitable source of vacuum. To the left of the chamber 76 in Figures 2 and 3 the body 20 is provided with a chamber 78 into which projects one end of a nut 79 threaded as at 80 into the body 20. The chamber 78 is provided with a vent passage 81 provided in its upper end with a conventional bleed plug (not shown).

The chamber 78 communicates through a passage 84 with a chamber 85 in which is arranged a conventional residual pressure valve 86. The chamber 85 communicates through a line 87 with a conventional master cylinder 88 having the usual plunger (not shown) operable by a pedal 89 for displacing fluid into the chamber 85. When fluid in the chamber 85 reaches the pressure at which the residual pressure valve 86 is loaded, the fluid flows through a port 92 into the chamber 41. The port 92 is shown in dotted lines in Figure 1 adjacent the ball 39, and this port is back of an annular flange 93 against which the seal 36 is arranged. Accordingly, it will be apparent that fluid displaced from the master cylinder into the chamber 41 assists the booster motor in moving the plunger 35 toward the right in Figure 1 to displace fluid from the chamber 33.

A bore 96 is formed in the nut 79. A sealed plunger 97 is slidable in the bore 96 and a reduced stem 98 at one end of the plunger is engageable with the adjacent end wall of the chamber 78 to limit movement of the plunger 97 toward the left as viewed in Figures 2 and 3.

The annular enlargement 75 (Figures 2 and 3) is provided with a cover member 100, and between such member and the enlargement 75 is clamped the peripheral portion of a diaphragm 101. The inner edge of this diaphragm is clamped between a pair of plates 102 and 103 the former of which is provided with spider arms 104 the centers of which carry a pin 105 operable by the plunger 97. The elements 101, 102, 103 and 105 are biased to the left to the normal position shown in Figure 2 by a spring 106 engaging the plate 103 and arranged in a chamber 107 between the cover member 100 and the diaphragm 101.

The plate 103 carries an open-ended axial tubular member 108 freely slidable through an opening 109 formed in the cover member 100. The latter member is recessed to provide a chamber 110 normally communicating with the interior of the tubular member 108. The interior of the tubular member obviously is in fixed communication with the vacuum chamber 76.

The cover member 100 is provided with a chamber 112 in fixed communication with the chamber 110, and the chamber 112 is formed as shown in Figure 4. In the embodiment of the invention shown, the chamber 112 is provided with three radially extending portions, for a reason which will become apparent.

The cover member 100 is provided with a cap 115, and within this cap the member 100 is provided with an annular flange 116 spaced from the wall of the cap 115 to form an annular chamber 117, the free edge of the flange 116 being sealed as at 118 with respect to the base of the cap 115. The annular chamber 117 is provided with an air inlet duct 120 preferably provided with an air cleaner (not shown). The annular chamber 117 further communicates with a relatively narrow annular chamber 121 perpendicular to the axis of the flange 116. Obviously, the chamber 121, throughout its circumference, is in fixed communication with the atmosphere.

Figure 2:
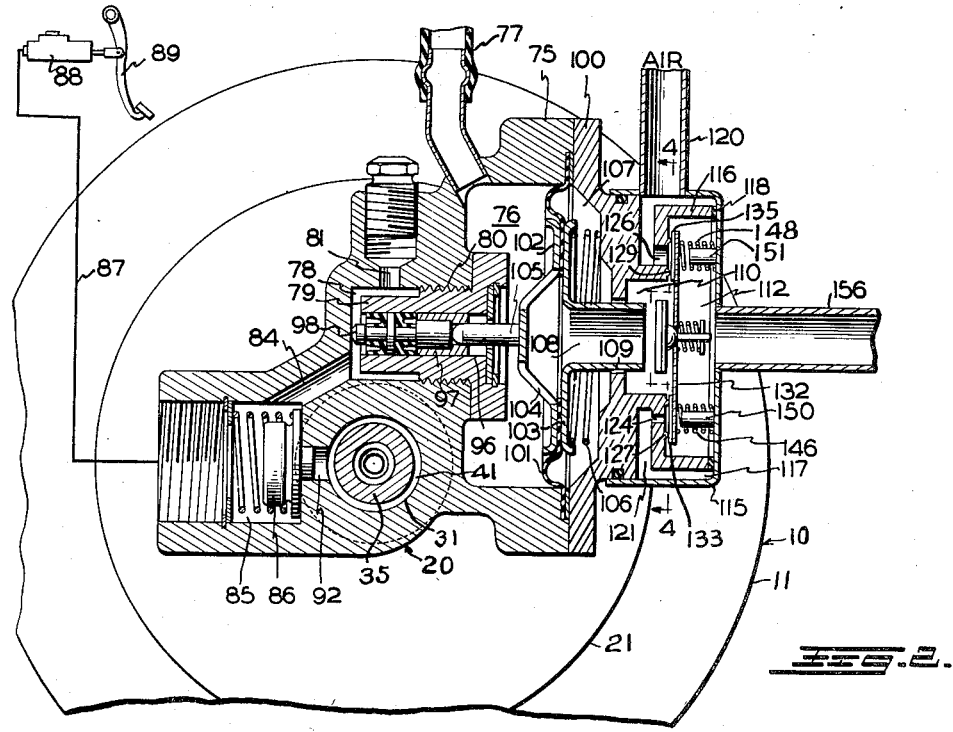
Figure 2 is a sectional view taken substantially on line 2—2 of Figure 1, showing the valve parts in normal positions.
Figure 3:
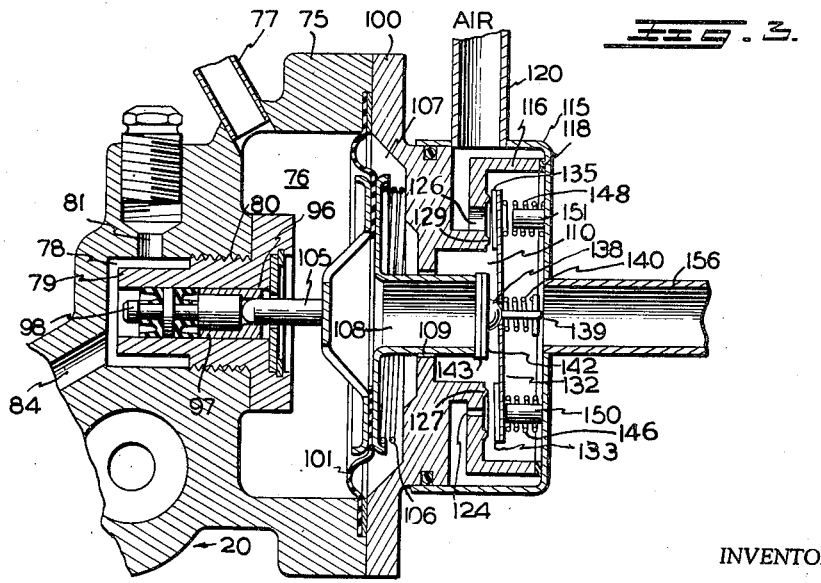
Figure 3 is a similar view showing initial valve actuation wherein one air port is uncovered.

The right-hand wall of the chamber 121, as viewed in Figures 2 and 3, is provided with a plurality of atmospheric ports shown in the present instance as being arranged respectively in radially extending portions of the chambers 112. Accordingly there are three such air ports, and they are indicated sucessively by the numerals 124, 125 and 126, the port 124 being quite small and the port 126 being the largest of the three ports. The port 125 preferably is of a diameter intermediate the diameters of the ports 124 and 126. These ports are provided consecutively with annular valve seats 127, 128 and 129, which may be identical in circumference with each other.

Arranged in the chamber 112 is a lever plate 132, shown in perspective in Figure 5 from which it will be noted that the lever plate corresponds in shape with the chamber 112 and is provided with radial extensions loosely fitting in the corresponding portions of the chamber 112. The projections of the lever plate 132 are provided consecutively with resilient valve elements 133, 134 and 135 engageable consecutively with the valve seats 127, 128 and 129.

Centrally thereof, the valve lever 132 has an axial opening against which is seated a hemispheral rocker 138 from which projects a stem 139 surrounded by a spring 140 to bias the head 138 against the plate 132. The head 138 carries a disk 142 against the inner face of which is secured a resilient valve 143 normally spaced from but engageable with the adjacent end of the tube 108.

It will be apparent that the sectional views in Figures 2 and 3 are distorted somewhat to show two of the valves for controlling the air ports, the lowermost valve in each figure being the valve 133 and the upper valve being either of the valves 134 or 135. The successive valved portions of the plate 132 are biased toward the air ports by springs 146, 147 and 148 (Figure 5) and for a reason which will become apparent, the spring 146 is relatively weak, the spring 147 is somewhat stronger, and the spring 148 is the strongest of the three springs referred to. The spring 146 surrounds a stationary stem 150 carried by the cap 115, and the inner end of the stem 150 is very slightly spaced from the valve plate 132, preferably not over 1/16". Each of the remaining springs 147 and 148 surrounds a similar stem 151 the free ends of which may be arranged at progressively different distances from the valve plate 132 when the latter is in its normal position.

The base of the cap 115 is connected to one end of a control duct 156, opening into the chamber 112. The duct 156 extends throughout the length of the motor 10, as shown in Figure 1, and is tapped through the cylinder head 13 for connection with the variable pressure chamber 16.

In the form of the invention described above, the tubular member 108 is actuated by hydraulic fluid from the master cylinder acting on the plunger 97. A somewhat modified form of the invention is shown in Figures 6 and 7, most of the parts of which are identical with those described and have been indicated by the same reference characters. Instead of the chamber 78 as it appears in Figures 2 and 3, the form of the invention in Figures 6 and 7 is provided with a cylindrical corresponding chamber 160. The enlargement 75 previously described is shown in the modified form as comprising two sections 161 and 162 in the former of which is formed a chamber 160, and the two sections 161 and 162 serve to clamp therebetween a resilient diaphragm 163 forming one end of the chamber 160. This diaphragm bears against a thimble 164 into which extends the stem 96 previously described. The thimble 164 carries an actuating plate 166 having notched arms 167 receiving and forming a fulcrum for receiving a plurality of radial levers 168 the outer curved arms 169 of which extend into an annular recess 170 in the section 162. The inner ends of the levers 168 engage a bearing plate 169 carried by the center of the spider 104. The notched arms 167 engage the levers 168 about one-third of the distance from the outer to the inner ends thereof, whereby the inner ends of the levers have a 2:1 ratio of movement relative to the outer ends thereof. The reason for this is that the diaphragm 163 is moved by fluid in the chamber 160 and since the diaphragm 163 is substantially larger than the plunger 97 previously described, a given displacement of fluid into the chamber 160 moves the diaphragm 163 to a relatively reduced extent. The use of the diaphragm 163 has one advantage in that it provides a perfect seal against leakage of hydraulic fluid from the chamber 160.

*Operation*

The parts of the form of the invention shown in Figures 1 to 5 normally occupy the positions shown in Figures 1 and 2. The motor chamber 17 is in constant communication with the vacuum source through the duct 18. The variable pressure motor chamber 16 communicates through the duct 156 with the chamber 112 (Figure 2), thence through chamber 110, tubular member 108, and vacuum chamber 76 with the source of vacuum of which the duct 77 is connected. Accordingly, the motor 10 will be vacuum-suspended.

To operate the apparatus, the pedal 89 will be depressed to displace fluid from the master cylinder through the line 87 into the chamber 85, thence through passage 84 into the chamber 78. Until a hydraulic pressure sufficient to open the residual pressure valve 86 is reached, this valve will remain closed. However, fluid in the chamber 78 will move the plunger 97 toward the right from the position shown in Figure 2 to move the tubular member 108 into engagement with the valve 143. This initial operation takes place against the compression of the spring 106 and disconnects the chambers 110 and 112 from the source of vacuum, as will be apparent. The loading of the spring 106 may be designed according to the desired performance characteristics of the apparatus, as will become more apparent below.

Further movement of the tubular member 108, acting through the valve 143, will move the center of the lever plate 132 toward the right. Such movement is opposed by the springs 146, 147 and 148, and since the spring 146 is the weakest of the three springs, it will be apparent that the corresponding portion of the lever plate 132 will move to the right to "crack" the port 124. This port provides quite restricted communication between the air chamber 121 and the control chamber 112, and results in a relatively restricted flow of air through the duct 156 into the motor chamber 16. Thus the motor 10 will be initially energized, but to a restricted extent, and the piston 14 will start to move to the right as viewed in Figure 1. Such movement is imparted by the piston rod 15 to the plunger 35, and initial movement of the latter permits the spring 38 to seat the ball 39 to disconnect the chambers 33 and 41. Further movement of the plunger 35 generates hydraulic pressure in the chamber 33 and displaces fluid into the wheel cylinders 136.

The movement imparted to the lever plate 132 in the manner referred to causes this plate to fulcrum on the valve seats 128 and 129 until the valve plate back of the valve 133 engages the pin 150. The adjacent portions of the valve plate is arrested in its movement, and further force applied to the center of the valve plate will cause it to overcome the tension of the spring 147. Thereupon, the lever plate fulcrums on the pin 150 and valve seat 129 to move the valve 134 off its seat, to increase communication between the chamber 112 and the atmosphere, thus accelerating the energization of the motor 10. When the lever plate 132 engages the pin 151 associated with the valve 134, then the lever plate will fulcrum on such pin and on the pin 150, and the spring 148 will be overcome to open the port 126.

From the foregoing, it will be apparent that the present construction provides a plurality of valves controlling a plurality of ports leading to a high pressure source, and the mechanism is of such nature as to successively open air ports of progressively increasing size. Accordingly, the relatively sudden energization of the motor is prevented, and this is important for a smooth modulated motor and brake-applying operation. The apparatus functions to prevent the piston 14 from "jumping" away from its normal off position during normal brake applications. It will be apparent, however, that for sudden emergency stops, the full depression of the pedal 89 will cause the sequential opening of the air ports to occur with extreme rapidity, thus providing for rapid and complete brake application.

When hydraulic fluid pressure in the chamber 85 reaches a predetermined point, the residual pressure valve 86 will open to admit fluid to the chamber 41 (Figure 1) and accordingly the pedal-generated hydraulic pressures, acting back of the plunger 35, will assist the motor 10 in generating brake applying pressures. The pressures in the chamber 41, moreover, react against the pedal 89 to provide the operator with an accurate "feel" proportionate to pressures in the chamber 33. The spring 106 may have a loading corresponding to the resistance provided by the residual pressure valve 86 against entrance of fluid into the chamber 41 (Figure 6). Under such conditions, motor energization will start substantially simultaneously with the feeding of hydraulic fluid from the master cylinder back of the plunger 35 (Figure 1). In accordance with the desired characteristics of operation, the spring 106 may be slightly stronger, in which case master cylinder fluid will pass through port 92 (Figure 2) slightly in advance of motor energization. Under such conditions, master cylinder pressure will force fluid through port 40 (Figure 1) into the chamber 33 to take up, or start to take up, play between the brake shoes and the drums prior to energization of the motor 10.

It is preferred that motor energization initially start prior to the admission of fluid into the chamber 41 through port 92 (Figure 2). Under such conditions, the spring 106 will be made relatively weak. Motor energization taking place prior to the displacement of master cylinder fluid into the chamber 41 will then cause the motor to be actuated to move the plunger 35 forwardly, thus reducing pressure in the chamber 41 and promptly resulting in the opening of the residual pressure valve 86. Thus hydraulic fluid is induced to flow into the chamber 41 by motor actuation of the plunger 35. This is the preferred operation and provides for a "soft" pedal and gradual pick-up in pedal resistance.

When the parts are in the normal off positions shown in Figure 2, leakage through the opening 109 maintains vacuum in the chamber 107, thus balancing pressures in the chambers 76 and 107. When air pressure is admitted into the chambers 112 and 110 by operation of the valve mechanism as described above, air will flow through the opening 109 into the chamber 107 to build up pressure in such chamber to oppose movement of the diaphragm 101 to the right in Figures 2 and 3. This building up of pressure in the chamber 107 provides a perfect follow-up action of the valve mechanism relative to movement of the pedal 89, and provides for a gradual building-up of an elastic pressure against the diaphragm 101 to provide the pedal 89 with "feel."

The brakes are released by releasing the brake pedal 89, whereupon pressure in the chamber 78 immediately drops. The air pressure in the chamber 107, together with the force of the spring 106, promptly returns the plunger 97 to its normal position together with tubular member 108. All of the air valves will be promptly seated, and the tubular member 108 will move away from the valve 143 and the parts will re-assume the normal positions shown in Figure 2.

The form of the invention shown in Figures 6 and 7 operates in a manner similar to the form previously described and need not be referred to in detail. The same lever plate and its air valves are employed and the same sequential opening of the air ports takes place. The difference between the two forms of the invention lies in the fact that valve actuation in Figure 6 takes place through hydraulic fluid in the chamber 160 acting against the diaphragm 163. For the reason stated above, this diaphragm for a given brake application will not move as far as the plunger 97. Hence the levers 168 are employed as multiplying means to increase the distance of travel of the tubular member 108, the pin 96 sliding in the thimble 164 to be guided thereby since the pin 96 will travel a greater distance than the thimble 164 because of the lever action. The modified form of the invention provides for the use of a sealing diaphragm 163 as the valve actuating means and compensates for the limited movement thereof by employing the levers 168, in which case the valve operation in the modified form of the invention will be identical with the operation previously described.

In view of the smooth progressive energization of the motor provided by the present construction, it is feasible to operate the valve mechanism by fluid directly displaced from the master cylinder 88, this fluid being available for performing its work before the opening of the residual pressure valve 86. If desired on any installations, however, the spring 106 may be made to overbalance the residual pressure valve 86 or to equal the loading of the latter, in which case valve actuation will take place after or simultaneously with the flow of hydraulic fluid into chamber 41 (Figure 1). Ordinarily, however, it is preferred that the spring 106 be weaker than the loading of the residual pressure valve 86. The nature of the invention is such as to provide a smoothly modulated operation which is assisted by the fact that the chamber 107 normally has vacuum established therein. The seepage of air through the opening 109 prevents sudden building up of air pressure in the chamber 107, thus providing for the stabilizing of the valve operation, the chamber 107 acting as a dash pot. This further improves the modulated action of the apparatus.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. A power mechanism comprising a differential pressure motor having a casing provided with a pressure responsive unit dividing it to form a pair of motor chambers one of which communicates with a source of relatively low pressure, and a valve mechanism connected for controlling pressures in the other of said chambers, said valve mechanism comprising a control chamber communicating with said other motor chamber, a low pressure valve seat communicating with said source of low pressure, a normally open low pressure valve engageable with said seat, a high pressure chamber in fixed communication with a source of relatively high pressure, a first and a second high pressure valve seat communicating with said high pressure chamber and provided therethrough respectively with a relatively restricted port and a relatively larger port, a first and a second high pressure valve engageable respectively with said first and second seats, means connected to normally bias said high pressure valves against their seats, and common means connected for first closing said low pressure valve and then sequentially opening said first high pressure valve and then said second high pressure valve.

2. A power mechanism according to claim 1 provided with a movable member carrying all of said valves, said common means being connected to effect closing movement of said low pressure valve and then to move said movable member to effect said sequential opening of said high pressure valves.

3. A power mechanism according to claim 1 provided with a movable member carrying all of said valves, said common means comprising an axially movable tubular member having said low pressure seat at one end thereof in alinement with said low pressure valve, whereby movement of said tubular member engages said low pressure seat with said low pressure valve to close the latter, whereupon further movement of said tubular member moves said movable member to effect said sequential opening of said high pressure valves.

4. A power mechanism according to claim 1 provided with a movable lever plate carrying all of said valves, said second valve seat forming a first fulcrum means for said plate, a second fulcrum means engaging said plate at a point spaced from said first and second valve seats, said valves and said seats being at one side of said plate, biasing means comprising first, second, and third springs of progressively greater strength engaging the opposite side of said plate adjacent consecutively said first and second valves and said second fulcrum means, whereby, upon operation of said common means, said low pressure valve will be closed and said lever plate will be rocked on said fulcrum means to first open said first valve, and means connected to act as a stop limiting movement of said lever plate adjacent said first valve and constituting a third fulcrum means whereby, upon further movement of said lever plate, said lever plate will rock on said second and third fulcrum means to open said second valve.

5. A power mechanism according to claim 1 provided with a movable lever plate carrying all of said valves, said second valve seat forming a first fulcrum means for said plate, a second fulcrum means engaging said plate at a point spaced from said first and second valve seats, said valves and said seats being at one side of said plate, said biasing means comprising first, second, and third springs of progressively greater strength engaging the opposite side of said plate adjacent consecutively said first and second valves and said second fulcrum means, said common means comprising a tubular member communicating with said source of low pressure and having said low pressure seat at one end adjacent said low pressure valve, whereby movement of said tubular member will first close said low pressure valve and then rock said lever plate on said first and second fulcrum means to open said first valve, and a stop connected to engage and limit movement of said lever plate adjacent said first valve and serving as a third fulcrum means whereby further movement of said lever plate will cause it to rock on said second and third fulcrum means to open said second valve.

6. A power mechanism comprising a differential pressure motor having a casing provided with a pressure responsive unit dividing it to form a pair of motor chambers one of which communicates with a source of relatively low pressure, and a valve mechanism connected for controlling pressures in the other of said chambers, a casing having a wall at opposite sides of which are formed a control chamber communicating with said motor chamber and a high pressure chamber, said wall being provided in said control chamber with first and second valve seats having respectively therethrough a relatively restricted and a relatively larger port, said wall being provided in said control chamber with a third seat, said seats being arranged around a predetermined axis, a tubular member slidably supported for movement on said axis, a lever plate in said control chamber having first and second valves respectively normally engaging said first and second seats, a low pressure valve carried by said lever plate and engaging the end of said tubular member, such end of said tubular member forming a low pressure seat normally disengaged from said low pressure valve, and means connected for differentially biasing said first and second valves toward their seats whereby, upon axial movement of said tubular member, said low pressure seat will engage said low pressure valve and move the center of said lever plate to first open said first valve and then open said second valve, said lever plate fulcruming on said second and third seats when said first valve opens, and a fixed element connected for engaging said lever plate and limiting opening movement of said first valve and forming with said third seat a fulcrum means on which said lever plate rocks when said second valve is opened.

7. A power mechanism according to claim 6 provided with manually operable means connected to axially move said tubular member, and means connected to bias said tubular member for movement of said low pressure seat away from said low pressure valve.

8. A power mechanism according to claim 6 provided with a hydraulic control cylinder, a plunger therein connected to said tubular member, means connected to force hydraulic fluid under pressure into said hydraulic control cylinder to move said plunger and said tubular member to close said low pressure valve, and means connected to bias said tubular member for movement of said low pressure seat away from said low pressure valve.

9. A power mechanism comprising a differential pressure motor having a casing provided with a pressure responsive unit dividing it to form a pair of motor chambers one of which communicates with a source of relatively low pressure, and a valve mechanism connected for controlling pressures in the other of said chambers, said valve mechanism comprising a housing provided with a wall forming at opposite sides thereof a high pressure chamber, and a control chamber communicating with said other motor chamber, said wall being provided with first, second and third valve seats projecting into said control chamber and being provided consecutively therein with first, second and third high pressure ports of progressively increasing size, said seats being spaced around a predetermined axis, a lever plate in said control chamber having first, second and third valves at the side thereof adjacent said wall and consecutively normally engaging said first, second and third seats, a low pressure valve carried by the same side of said plate at said axis, common means on said axis connected for applying a force to said side of said plate to tend to move said first, second and third valves away from their seats, first, second and third springs engaging the opposite side of said lever plate consecutively adjacent said first, second and third valves, said springs being on progressively increased loading whereby operation of said common means will first open said first valve, while said plate rocks on said second and third seats, and a fixed element connected to limit opening movement of said first valve and forming with said third seat a fulcrum means whereby, after said first valve has been opened, said plate will rock on said fulcrum means for opening movement of said second valve, after which said third spring will be overcome and said third valve will be opened.

10. A power mechanism according to claim 9 provided with manually operable means connected to operate said common means.

11. A power mechanism according to claim 9 provided with a hydraulic control cylinder, a piston in said cylinder connected to said tubular member, means connected for introducing hydraulic fluid into said cylinder to move said piston and said tubular member, and means connected to bias said tubular member away from said low pressure valve.

12. A power mechanism comprising a differential pressure motor having a pressure responsive unit and a variable pressure chamber at one side of such unit, and a valve mechanism connected for controlling pressures in said chamber, said valve mechanism comprising a control chamber communicating with said motor chamber, a first valve seat communicating with a first source of fluid pressure, a first normally open valve engageable with said first valve seat, a pressure chamber in fixed communication with a second source of fluid pressure different from the pressure of said first source, a second and a third valve seat communicating with said pressure chamber and provided therethrough respectively with a relatively restricted port and a relatively larger port opening into said control chamber, a second and a third valve engageable respectively with said second and third valve seats, means connected to normally bias said second and third valves against their respective seats, and common means connected for first closing said first valve and then sequentially opening said second valve and said third valve.

13. A power mechanism according to claim 12 provided with a movable member carrying all of said valves, said common means being connected to first effect closing movement of said first valve, and then to move said movable member to effect said sequential opening of said second and third valve.

14. A power mechanism according to claim 12 provided with a movable member carrying all of said valves, said common means comprising an axially movable tubular member having a seat at one end thereof communicating with said first source and arranged in alinement with said first valve, whereby movement of said tubular member engages its valve seat with said first valve to close the latter, whereupon further movement of said tubular member moves said movable member to effect said sequential opening of said second and third valves.

References Cited in the file of this patent
UNITED STATES PATENTS

| | | |
|---|---|---|
| 2,332,340 | Price | Oct. 19, 1943 |
| 2,462,015 | Whitten | Feb. 15, 1949 |